April 2, 1929.　　　　S. NOVAK　　　　1,707,233

GRASS KICKER

Filed Aug. 16, 1926

INVENTOR
STEVE NOVAK
By Ben V. Zillman
ATTORNEY

Patented Apr. 2, 1929.

1,707,233

UNITED STATES PATENT OFFICE.

STEVE NOVAK, OF EAST ST. LOUIS, ILLINOIS.

GRASS KICKER.

Application filed August 16, 1926. Serial No. 129,334.

My invention relates to improvements in attachments for lawn mowers, and has for its objects, the production of a device of the kind described, which shall be simple, convenient, economical, durable, reliable, and efficient and satisfactory for use wherever found applicable.

Other objects of my invention are the production of an attachment for a lawn mower, which shall act to kick back that grass which has already been mown, so as to prevent such grass from ruining the standing grass through smothering the latter.

Many other objects and advantages of the construction herein shown and described will be obvious to those skilled in the art to which this invention appertains, from the disclosures herein given.

To this end my invention consists in the novel construction, combination and arrangement of parts herein shown and described, and more particularly pointed out in the claim.

In the drawings, wherein like reference characters indicate like or corresponding parts, Figure 1 is a side elevation of my device, shown attached to a lawn mower;

Figure 1:
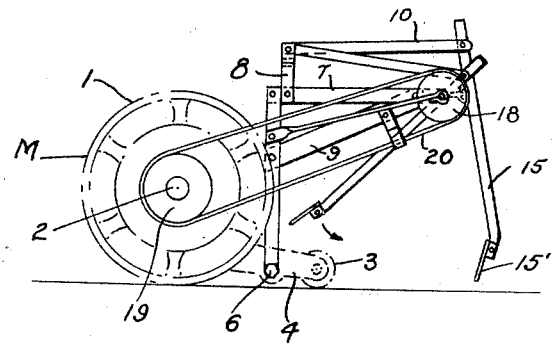
Figure 2:
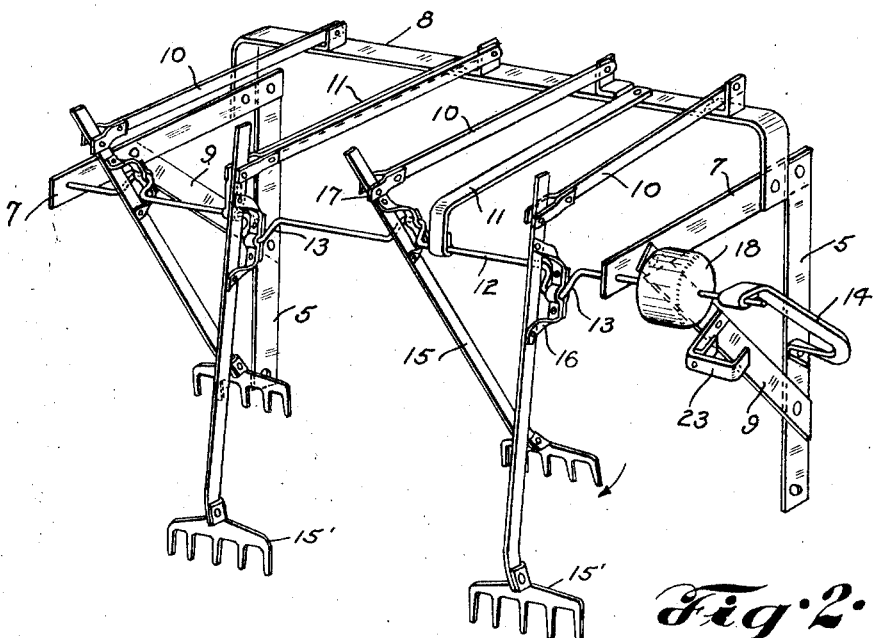
Figure 2 is a perspective view of the device, detached.

In the drawings, wherein I have illustrated the preferred embodiment of my invention, there is shown a lawn mower, M, the same being of any usual or preferred construction, not forming a part of my invention, said lawn mower having the usual drive wheels 1 connected to the drive shaft 2. The rear roller 3 of the mower, is rotatably journalled in a rearwardly portion 4 of the frame-work of the mower.

If the lawn is mowed and the grass is allowed to remain on top of the standing grass, the latter is apt to become smothered, and thereby ruined. In order to prevent this, I have provided an attachment for the mower, which will act to kick back the grass that has been mowed, thereby permitting the standing grass to be reached by the sun and air, and thereby promote its growth.

This attachment comprises a pair of uprights 5 of the frame-work, said uprights being adapted to be suitably connected to the mower, as by inserting bolts 6 through apertures in the portion 4 of the mower frame and through similar apertures in the lower end of the uprights.

Rigidly connected to the upper ends of the uprights and extending rearwardly therefrom, are the bars 7, and a tie rod 8 extends across the forward ends of these bars 7 and is connected at its ends thereto. If desired, bars 9 may be rigidly connected at their ends, at an angle, to the uprights and the bars 7, as shown, in order to act as a brace for the frame.

A shaft 12 is journalled at the ends of the bars 7 farthest away from the tie rod 8, said shaft having one or more offset portions or crank arms 13 thereon, and a bar 14 and bars 11 are rigidly connected at one end to the upright 5 and the tie rod 8, respectively, and at their other ends are provided with a loop to rotatably receive the shaft 12.

A fork handle 15, having a fork 15' detachably connected to its lower end is pivotally connected at its upper end to each of the links 10 that are pivoted to the tie rod 8, there being one fork for each link, as shown. Each fork handle is pivotally connected intermediate its ends, to a crank arm 13 of the shaft 12, by means of the detachable brackets 16, thereby permitting easy replacement of the parts.

The shaft 12 may be driven in any suitable manner, and in the present instance I have driven it through a pulley and belt, the pulley 18 being journalled upon the shaft intermediate the arm 14 and its adjacent bar 7. In order that the pulley will transmit rotative movement to the shaft in only one direction and permit the pulley to "overrun" in the reverse direction, I have provided spring prongs 22 on the interior of the pulley, adapted to engage with ratchet teeth 21 carried by the shaft 12. A pulley 19 may be mounted upon the shaft of the mower, and a belt 20 passed over the pulleys 18 and 19.

Figure 3:
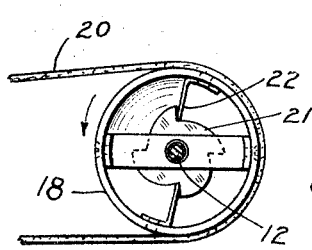
Figure 3 is a detail view of a portion of the drive mechanism.

Thus it will be seen that when the mower is pushed forwardly, or in a direction so as to cut the grass, as indicated by the arrow in Figure 3, the prongs 22 will engage against the shoulders of the ratchet teeth and transmit the drive from the pulley 18 to the crank shaft 12, but when the mower is moved in the reverse direction, the teeth will permit the spring prongs to slip past, and allow the pulley 18 to overrun its shaft without transmitting any drive thereto.

A belt guide 23 may be mounted upon the frame in order to maintain the belt in the desired position, if so desired.

From the foregoing description, it will be seen that I have provided a mechanism, whereby the forks will be operated through crank arms, to swing downwardly and thence rearwardly during the forward movement of the mower, and thereby the forks will engage the grass previously mowed, and throw or kick it back, off the standing grass.

The usual grass catcher may be used in connection with the kicker, if so desired, simply by attaching the former to the mower so that the bag is rearwardly of the forks.

Having thus described my invention, it is obvious that various immaterial modifications may be made in the same without departing from the spirit of my invention; hence I do not wish to be understood as limiting myself to the exact form, arrangement, construction and combination of parts herein shown and described, or uses mentioned, except as limited by the claim.

What I claim as new and desire to secure by Letters Patent is:

An attachment to a lawn mower adapted to operate during the forward cutting movement of said mower and to become predeterminedly inoperative during any other movement of said mower, said attachment comprising a plurality of forks, handles attached to said forks, links pivotally connected at one of their ends to said handles near the upper ends thereof, said links being connected at their opposite ends to a supporting framework adapted to be secured to said lawn mower, a crank shaft journalled in said supporting framework, crank arms on said crank shaft, detachable brackets on said fork handles for receiving said crank arms therethrough, and a pulley on one end of said crank shaft provided with means adapted to rotate said shaft and thus actuate the forks during cutting movement only of the lawn mower, said means including spring prongs on the interior of the pulley engageable with ratchet teeth carried by said shaft.

STEVE NOVAK.